United States Patent [19]

Lin et al.

[11] Patent Number: 4,620,859

[45] Date of Patent: Nov. 4, 1986

[54] METHOD FOR MAKING COALESCED MINERAL FIBERS

[75] Inventors: David C. K. Lin, Newark; Larry J. Huey, Granville; Farrokh Kaveh, Dublin, all of Ohio

[73] Assignee: Owens-Corning Fiberglas Corporation, Toledo, Ohio

[21] Appl. No.: 830,391

[22] Filed: Feb. 14, 1986

Related U.S. Application Data

[63] Continuation-in-part of Ser. No. 677,664, Dec. 3, 1984, abandoned.

[51] Int. Cl.⁴ .......................................... C03B 37/022
[52] U.S. Cl. ............................................. 65/2; 65/1; 65/12; 264/177.2; 425/76; 425/463; 428/399
[58] Field of Search ............................ 65/1, 2, 8, 12; 264/177 F; 425/76, 463; 428/399

[56] References Cited

U.S. PATENT DOCUMENTS

| | | |
|---|---|---|
| 2,294,266 | 8/1942 | Barnard ........................ 65/1 |
| 2,453,864 | 11/1948 | Schlehr ..................... 65/12 X |
| 2,465,283 | 3/1949 | Schlehr ..................... 65/12 X |
| 2,578,986 | 12/1951 | Schoonenberg et al. . |
| 2,908,036 | 10/1959 | Russell ......................... 65/12 |
| 3,063,094 | 11/1962 | Warthen . |
| 3,268,313 | 8/1966 | Burgman et al. ............ 65/2 X |
| 3,425,454 | 2/1969 | Eakins et al. ............... 65/2 X |
| 3,600,491 | 8/1971 | Shimoda et al. ......... 264/177 F |
| 3,607,185 | 9/1971 | Andrysiak .................... 65/1 X |
| 3,623,939 | 11/1971 | Ono et al. ............. 264/177 F X |
| 3,650,716 | 3/1972 | Brossard . |
| 3,775,074 | 11/1973 | Russell ......................... 65/8 X |
| 3,912,478 | 10/1975 | Presby . |
| 3,914,488 | 10/1975 | Gorrafa ................. 264/177 F X |
| 4,001,369 | 1/1977 | Shah ..................... 264/177 F X |
| 4,028,081 | 6/1977 | Marcatili . |
| 4,038,062 | 7/1977 | Presby . |
| 4,050,915 | 9/1977 | Brown . |
| 4,091,065 | 5/1978 | Shah ....................... 264/177 F |
| 4,144,044 | 3/1979 | Russell . |
| 4,307,478 | 12/1981 | Ward et al. ............... 428/399 X |
| 4,316,924 | 2/1982 | Minemura et al. ....... 428/399 X |
| 4,329,163 | 5/1982 | Russell ..................... 65/12 X |
| 4,349,364 | 9/1982 | Morrison . |
| 4,362,541 | 12/1982 | Thömpson ................ 65/12 X |
| 4,376,746 | 3/1983 | Ward et al. ........... 264/177 F X |
| 4,385,916 | 5/1983 | Jochem et al. . |
| 4,391,618 | 7/1983 | Lecron . |
| 4,398,933 | 8/1983 | Lecron . |
| 4,401,451 | 8/1983 | Lecron . |
| 4,437,869 | 2/1984 | Lecron . |
| 4,469,499 | 9/1984 | Lecron . |

FOREIGN PATENT DOCUMENTS

835428 12/1938 France ......................... 65/12

OTHER PUBLICATIONS

"Cooling of a Free Jet with Variable Viscosity", paper #68-FF-19 Transactions of the ASME, Glicksman, 10/1968.

Primary Examiner—Robert Lindsay
Attorney, Agent, or Firm—Ronald C. Hudgens; Greg Dziegielewski; Ted C. Gillespie

[57] ABSTRACT

A method for making mineral fibers comprising discharging molten glass as primary molten streams from orifices and joining at least one primary stream to an adjacent primary stream to form a coalesced stream of different cross-sectional shape from that of the orifices, and hardening the coalesced stream into a glass fiber having a cross-sectional shape similar to the shape of the coalesced stream.

6 Claims, 12 Drawing Figures

METHOD FOR MAKING COALESCED MINERAL FIBERS

This is a continuation-in-part of Ser. No. 677,664, Filed Dec. 3, 1984 now abandoned.

TECHNICAL FIELD

This invention pertains to mineral fibers and the manufacture of mineral fibers for such uses as textiles, reinforcements, construction materials, and insulating materials. With respect to this invention, mineral fibers means fibers of glass, rock, slag or basalt. In one of its more specific aspects, this invention pertains to non-circular mineral fibers and, in particular, non-circular glass fibers.

BACKGROUND OF THE INVENTION

The production of wool glass fibers by means of the rotary process is well known. In general, molten glass is fed into a spinner which revolves at high speeds. The spinner has a peripheral wall containing a multiplicity of orifices. Molten glass passed by centrifugal force through the orifices of the peripheral wall forms small diameter molten glass streams. Positioned circumferentially about the spinner is an annular blower for turning the fibers downwardly and, in some cases, for further or secondary attenuation of the original or primary fibers to produce fibers of smaller diameter. As the streams of molten glass are emitted from the orifices, they are still sufficiently nonviscous that surface tension forces pull or shape each of the molten streams into substantially circular cross-sections, regardless of the cross-sectional shape of the streams as they are emitted from the orifices. Further, rotary fiberizers are typically equipped with annular burners or other sources of hot gases for secondary attenuation of the primary fibers; these hot gases keep the glass sufficiently fluid or nonviscous that fibers of substantially circular cross-section result.

The production of textile or continuous glass fibers by mechanically drawing molten streams of glass from orifices in the bottom wall of a bushing or feeder is also well known. Non-uniformities in the roundness of the molten streams tend to be corrected by surface tension forces prior to the cooling and hardening of the molten streams into glass fibers. Thus, as in the case of wool glass fiber production, it has not been possible to produce significantly non-circular continuous fibers using shaped orifices in a bushing.

There has long been a need for producing fibers, both in the rotary process and in the continuous fiber process, that have significantly non-circular cross-sections. With respect to reinforcement of resin matrices, such non-circular fibers would be useful in imparting greatly increased transverse strength and improved shear strength qualities. Non-circular fibers for use as insulation materials would be advantageous in that the increased surface area per unit volume of glass would lower the thermal conductivity of insulation made from such fibers.

A measure of the non-circularity of mineral fibers is the "mod ratio", which is defined as the ratio of the diameter of the smallest circle into which the fiber cross-section fits to the diameter of the largest circle which can fit inside the fiber cross-section. As employed herein, fibers having a mod ratio of less than 1.2 are referred to as circular fibers; fibers having a mod ratio greater than or equal to 1.2 are referred to as non-circular fibers.

There has also been a need to produce hollow mineral fibers, both by the rotary process and by the continuous fiber process. Hollow fibers would be stronger and lighter than the equivalent solid fibers, and would provide improved resistance to heat flow for thermal insulation products.

One attempt to make non-circular glass fibers was by Warthen, as described in U.S. Pat. No. 3,063,094. Warthen's method employs mechanical perturbation of the glass stream while it is still in a plastic, deformable state. Warthen teaches that to create a non-circular fiber, the glass stream, initially in a conical shape with a circular cross-section, should be distorted at a region where the viscosity of the stream is sufficiently high as to become rapidly chilled or solidified during attenuation of the streams to a continuous fiber whereby a similar distortion in the cross-sectional configuration is retained in the attenuated solidified fiber. Warthen also teaches that a heat sink is to be applied to the glass stream by direct contact. This raises the viscosity of the molten glass to better enable retention and perpetuation of the non-circular cross-sectional character of the mechanically perturbed molten glass stream.

In the art of producing organic fibers, it is a common practice to use quenching methods to solidify molten streams of organic material into non-circular cross-sections which are similar to the shapes of the non-circular orifices. However, these methods are practical under conditions which differ greatly from conditions associated with forming mineral fibers. The production of organic non-circular fibers can be facilitated by pressurization of the bushings, whereas pressurization of bushings containing molten glass presents severe operating problems. The melting points of glass and organic compositions differ by 1500° F. (815° C.) or more. The mineral material of this invention will have a liquidus temperature greater than about 1200° F. (649° C.), whereas organic compositions soften and/or decompose at much lower temperatures.

The differences in physical characteristics can be clearly understood by comparing the ratio of viscosity-to-surface tension for glass with the same ratio for organic fiber forming material. The viscosity-to-surface tension ratio (poises/(dynes/cm)) of polymers lies within the range of from about 25 to about 5000. The ratio for glass is within the range of from about 0.1 to about 25, preferably within the range of from about 0.25 to about 5, and most preferably within the range of from about 0.4 to about 4. The viscosity of molten glass at fiber forming temperatures is typically about 300 poises whereas the viscosity of the molten organic material is typically on the order of about 1000 to about 3000 poises. Also, the surface tension forces of glass (on the order of about 250 to about 300 dynes/cm) are an order of magnitude greater than those of the organic material (about 30 dynes/cm). The lower viscosity and higher surface tension of glass make it about 100 times more difficult to prevent the shaped glass fibers from re-forming into glass fibers having circular cross-sections.

In spite of past attempts to manufacture non-circular and hollow mineral fibers, there has never been a commercially successful method or apparatus for achieving the goal of making hollow fibers or non-circular fibers from non-circular orifices.

STATEMENT OF THE INVENTION

It has now been found that mineral fibers, such as glass fibers, with improved properties can be produced with hollow and/or non-circular cross-sections by discharging primary streams of molten mineral material from orifices in a bushing wall or in a spinner peripheral wall and coalescing the primary streams to each other, or coalescing portions of each primary stream to itself, to form a coalesced stream of different cross-sectional shape from that of the orifices, thereby producing a mineral fiber having a cross-sectional shape similar to the shape of the coalesced stream. The invention can be employed with groups of orifices forming primary streams which are joined to form a coalesced stream having a non-circular shape. Also, hollow fibers can be produced by joining separate primary streams, or by joining the lobes or ends of individual streams into a circular or hollow shape. In order to successfully produce mineral fibers having non-circular cross-sections, the coalesced streams must be quenched sufficiently fast, as by forceable convection cooling, to harden them into non-circular mineral fibers. Also, when used with the rotary process, the invention must be accompanied by the absence of external heating means, or at least a substantial reduction in heat from external heating means.

According to this invention, there is provided a method for making mineral fibers comprising discharging molten mineral material as primary molten streams from orifices positioned in the wall of a container for holding a body of molten mineral material, joining at least one primary stream to an adjacent primary stream to form a coalesced stream of different cross-sectional shape from that of the orifices, and hardening the coalesced stream into a mineral fiber having the approximate cross-sectional shape similar to the shape of the coalesced stream.

In a preferred embodiment of the invention, the external perimeter of the cross-section of the mineral fiber is non-circular.

In another preferred embodiment of the invention, the joining step forms a coalesced stream having a hollow cross-sectional shape, and the hollow coalesced stream is hardened into a hollow mineral fiber.

In a specific embodiment of the invention, the external perimeter of the cross-section of the mineral fiber is non-circular.

According to this invention, there is provided a method for making mineral fibers comprising discharging molten mineral material as multilobal primary molten streams from orifices positioned in the wall of a container for holding a body of molten mineral material, joining a lobe of a primary stream to an adjacent lobe of the primary stream to form a coalesced stream of different cross-sectional shape from that of the orifices, and hardening the coalesced stream into a mineral fiber having a cross-sectional shape similar to the shape of the coalesced stream.

According to this invention, there is also provided a mineral fiber produced according to the method of the invention.

DESCRIPTION OF THE INVENTION

This invention will be described in terms of a glass fiber forming process and apparatus, and glass fibers made therefrom, although it is to be understood that the process is suitable for fibers of other mineral materials, particularly of such mineral materials as rock, slag and basalt.

Figure 1:
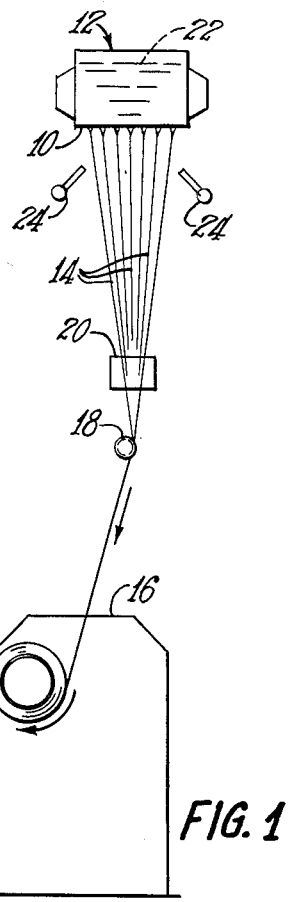
FIG. 1 is a schematic cross-sectional view in elevation of apparatus for forming glass fibers from a textile bushing according to the principles of the invention.
Figure 2:
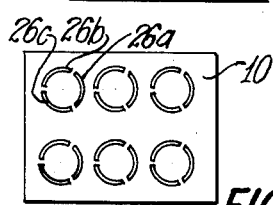
FIGS. 2, 3 and 4 illustrate schematically orificed shapes of bushing bottom walls to be used in accordance with the principles of the invention.
Figure 3:
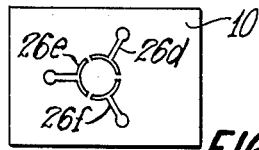
Figure 4:
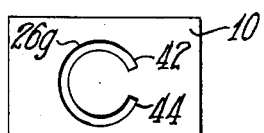

As shown in FIG. 1, molten glass is emitted from orificed bushing bottom wall 10 of feeder or bushing 12, and drawn into fibers 14 by any suitable means, such as by the mechanical action of winder 16. Gathering shoe 18 and size applicator 20 can be employed in the manner well-known in the art. The bushing contains a body of molten glass 22 from which the fibers are drawn. As illustrated, air nozzles 24, which are means for quenching the streams of molten glass, are positioned to direct air into contact with the molten glass as it is emitted from the bottom bushing wall. The air flow cools the molten glass quickly enough into glass fibers so that they are able to retain a cross-sectional shape similar to the shape exhibited in the molten form. Other suitable cooling fluids, such as carbon dioxide, nitrogen, steam or water, can be employed to forceably cool the molten streams. As shown in FIGS. 2-4, and in FIG. 7, the bushing bottom wall is adapted with one or more orifices. The orifices can be of any shape suitable for forming streams which are to be coalesced into mineral fibers having shapes different from the shapes of the orifices. For example, the orifices can be slots, crosses or other multilobal shapes, and in various configurations.

Figure 7:
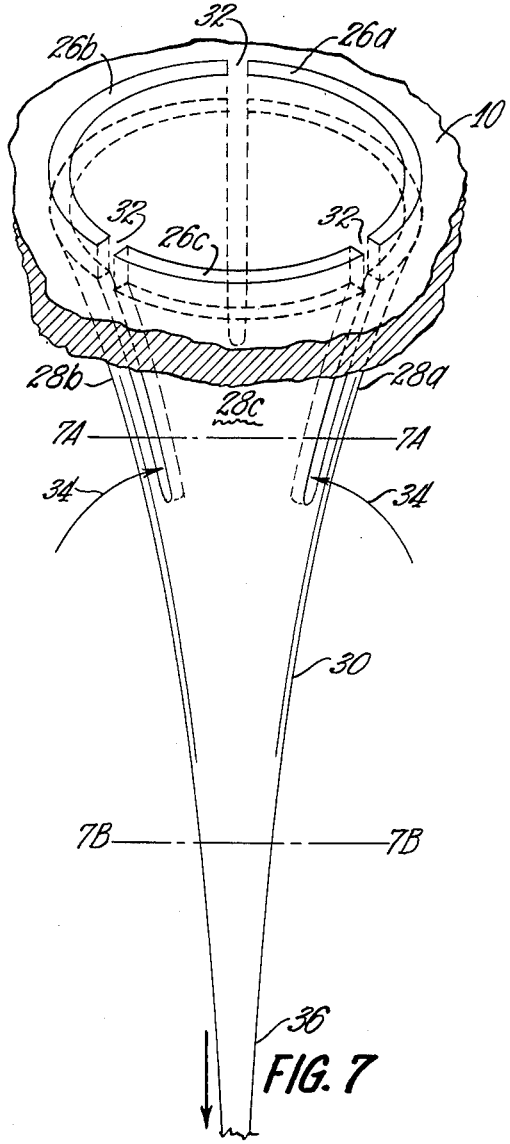
FIG. 7 is a perspective view of a hollow fiber being formed from orifices similar to those shown in FIG. 2.

The bushing bottom wall shown in FIG. 2 contains clusters or groups of orifices, 26a, 26b and 26c, which can be used to produce hollow fibers according to the invention. As shown in FIG. 7, orifices 26a, 26b and 26c positioned in the bushing bottom wall provide primary streams of molten glass, 28a, 28b and 28c, respectively. At reference line 7A—7A these primary streams have the appearance of a grouping of three orifices, similar to those shown in FIG. 2. As the primary molten glass streams are drawn further downward by the mechanical action of the winder, the primary streams are joined to form coalesced stream 30 which has a cross-sectional shape different from those of the three orifices 26a, 26b and 26c. The cross-sectional shape of the coalesced stream at reference line 7B—7B is similar to that shown in FIG. 5. Positioned between the different orifices (and between primary streams) are gaps 32 which enable air flow into the interior of the hollow coalesced stream, as indicated by arrows 34. The inspiration of the air through the gaps occurs because of the negative pressure zone developed by the mechanical pulling force, or the body forces of the molten glass. The coalesced stream is rapidly cooled to form a hollow fiber, such as hollow fiber 36, shown in FIG. 5.

Figure 6:
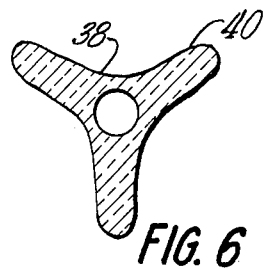

As shown in FIGS. 3 and 6, non-circular orifices 26d, 26e and 26f can be used to produce hollow fiber 38 having external perimeter 40 which is non-circular. The production of such a non-circular fiber requires suitable quenching of the coalesced stream in order to prevent the stream from returning to a hollow round stream by the action of surface tension forces.

Figure 5:
FIGS. 5 and 6 illustrate the cross-sectional shape of glass fibers made from the orifices illustrated in FIGS. 2-4, respectively.

As shown in FIG. 4, orifice 26g can be used to create a C-shaped primary molten glass stream which is coalesced to form a hollow fiber of the cross-sectional shape shown in FIG. 5. The coalescing step requires joining lobes 42 and 44 of the primary stream to form a hollow coalesced stream.

As can be seen by the previous discussion of the bushings, orifices and fiber cross-sectional shapes of FIGS. 2-7, numerous orifice shapes and orifice groupings can be utilized to produce fibers having many different shapes, and including hollow fibers, by using the method of the invention.

Figure 8:
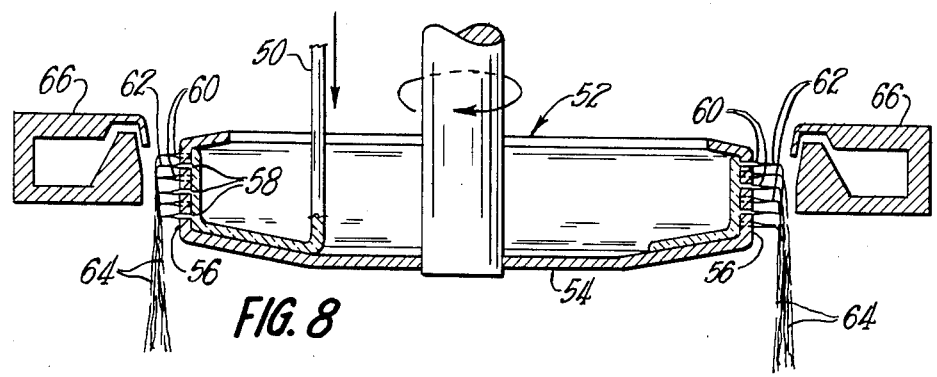
FIG. 8 is a schematic cross-sectional view in elevation of apparatus for forming non-circular glass fibers from a spinner according to the principles of the invention.

As shown in FIG. 8, molten glass 50 is supplied to rotating spinner 52. The molten glass impinges on bottom wall 54 of the spinner and flows outwardly by centrifugal force to the spinner peripheral wall 56. The spinner peripheral wall contains orifices 58 through which molten primary streams of glass 60 emanate. The primary streams are then joined to adjacent streams to form coalesced streams 62. The relative motion of the coalesced streams and the air surrounding the spinner results in a quenching of the molten streams into glass fibers 64. To some extent, the rate of quenching can be controlled by the rotational rate of the spinner. Other methods of controlling the quench rate include the use of external air sources, baffles or a heat source such as an annular burner, not shown. An annular blower, such as blower 66, can be positioned concentrically around the spinner to turn the fibers down for collection of the fibers, which can be by conventional means.

Figure 9:
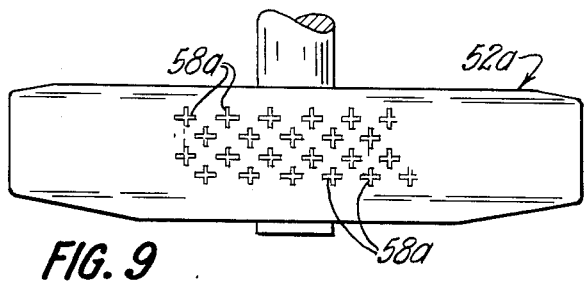
FIG. 9 is a schematic view in elevation of a spinner having cross-shaped orifices according to the principles of the invention.
Figure 11:
FIG. 11 illustrates a cross-shaped non-circular glass fiber made from a spinner having a cross-shaped orifice.
Figure 12:
FIG. 12 illustrates a cross-section of a non-circular fiber produced from a cross-shaped orifice in which two of the four fiber lobes are joined to create a hollow fiber.

The spinner can be adapted with non-circular orifices of various shapes, such as slots, crosses, or other multilobal shapes and in various configurations. As shown in FIG. 9, the spinner can be adapted with cross-shaped orifices 58a to produce primary molten glass streams 60a having the cross-sectional shape shown in FIG. 11, with four lobes, 68. Under preferred operating conditions, the primary stream 60a is buffeted by the air drag forces in the centrifuging process to cause two of the lobes to join and coalesce into a loop 70, thereby forming a coalesced stream of different cross-sectional shape from that of the cross-shaped orifices, similar to that shown in FIG. 12. Appropriate quenching of the coalesced stream produces a hollow mineral fiber having the shape shown in FIG. 12. Thus, a hollow mineral fiber having a non-circular external perimeter can be made using the rotary process as well as using the textile process.

Figure 10:
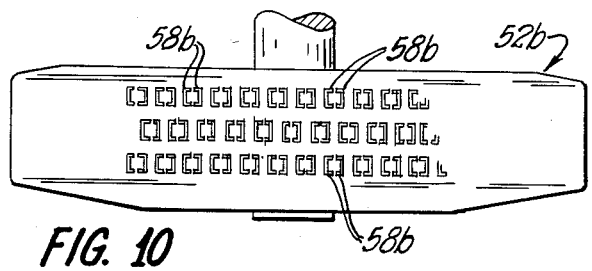
FIG. 10 is a schematic view in elevation of a spinner having opposed C-shaped slots as orifices.

As shown in FIG. 10, the spinner can be adapted with opposed C-shaped orifices 58b to produce hollow fibers from the rotary process. These fibers will have a cross-section similar to that shown in FIG. 5.

In order to quantitatively describe the formation of non-circular glass fibers, it is useful to consider a time constant $\tau$ for the decay of the shape from non-circular cross-section back to circular cross-section. As soon as a molten glass stream of non-circular cross-section flows from a non-circular orifice, surface tension forces act on the stream to change it into a circular cross-section. Opposing these forces are viscous forces, which tend to resist changes in the shape of the stream. The viscous forces increase extremely rapidly because of cooling as the molten glass in the stream moves away from the orifices. In order to successfully make non-circular fibers, the viscous forces (i.e., the viscosity) must be increased quickly enough to retard the effect of the surface tension forces.

The time constant is believed to be the function of the viscosity of the glass, the equivalent radius of the glass stream, and the surface tension, according to the equation: $\tau = \mu r / \sigma$. This equation can be transformed with a velocity factor to enable integration over distance along the fiber, i.e., the distance away from the spinner peripheral wall, instead of with respect to time. In operation, when only a few time constants pass prior to the hardening or greatly increased viscosity of the glass, the fiber still maintains its non-circular shape. When many time constants pass, however, prior to reaching high viscosity, the glass stream returns to a circular cross-section and produces a circular fiber. When the inverse of the time constant is integrated over the distance to 100% attenuation, the ratio of the time-to-become-viscous to the time-to-revert-to-a-circular-cross-section is obtained. This ratio, difficult to measure exactly, can be estimated by the ratio Z, as given by the following equation:

$$Z = (x_{75}\sigma_o/\mu_o r_{eo})*(1/v_o)*(1/MR_o - 1)$$

where:
  $x_{75}$ is the distance from the spinner peripheral wall at 75 percent attenuation (cm);
  $\mu_o$ is the initial viscosity (poise);
  $r_{eo}$ is the initial equivalent fiber radius (cm);
  $\sigma_o$ is the initial surface tension of the mineral material (dynes/cm);
  $v_o$ is the initial velocity (cm/sec) through the orifices; and
  $MR_o$ is the initial mod ratio of said streams.

The factor $1/(MR_o - 1)$ is a factor indicative of the mod ratio of the hole, and hence the initial mod ratio of the glass stream. It has been found that this equation correlates very well with theoretical considerations. It has been found that in order for the final fiber to be non-circular, Z should be less than or equal to 2, and preferably less than or equal to 1.

The inertia forces or glass pressure at the orifices can affect the extent to which non-circular fibers can be formed. The pressure can be produced by any means, such as the hydrostatic head of the molten glass and the spinner diameter and rotation rate. For the production of glass fibers from the rotary process the hydrostatic pressure is preferably within a range of from about 0.5 psi (3480 Pascals) to about 250 psi (1,720,000 Pascals).

The non-circular fibers of the invention can be made into an insulation product, such as building insulation. Preferably, the insulation product will have a binder.

Any suitable binder, such as a phenol formaldehyde urea binder, will be sufficient.

Some non-circular fibers will have physical properties different from those of circular fibers, thereby affecting properties of insulation products. For example a fiber with an I-beam cross-section would be stiffer than a circular fiber. Thus, an insulation product of I-beam fibers might exhibit improved recovery characteristics. The inherent increased surface area of non-circular fibers over circular fibers would likely result in insulation products of lower thermal conductivities. Non-circular and/or hollow fibers of the invention could be employed in insulation products to provide lower thermal conductivities, while potentially using less mineral material. These products could therefore be lighter in weight and lower in cost than insulation products made from circular fibers.

EXAMPLE

Coalesced glass fibers were made from a 15 inch spinner having 721 cross-shaped orifices under the following conditions:

Cross-shaped Orifice size (vertical rectangle identical to horizontal rectangle):
  width: 15 mil (0.381 mm)
  length: 250 mil (6.35 mm)
Glass temperature = 2000±50° F. (1093±28° C.)
Glass type: AF Standard silica wool glass
Glass pull rate: 1150±50 lbs/hr (522±23 kg/hr)
Spinner RPM: 2400
Internal burner gas flow: 390 scfh (184 liters/min)
Blower flow: 300 cfm (8,496 liters/min)
Blower pressure: 60 psi (4.22 kg/cm$^2$)

Under these operating conditions, adjacent pairs of lobes of the cross-shaped molten streams coalesced to form a double hollow fiber in the shape of a figure eight. The double hollow fibers had a wall thickness within the range of from about 12 to about 20 HT (3 to 5 microns) and an overall width within the range of from about 300 to about 450 HT (75 to 113 microns). It was found that a reduction in the spinner RPM resulted in the production of non-coalesced cross-shaped fibers.

It will be evident from the foregoing that various modifications can be made to this invention. Such, however, are considered as being within the scope of the invention.

INDUSTRIAL APPLICABILITY

This invention will be found to be useful in the production of glass fibers for such uses as thermal and acoustical insulation products and reinforcements for resin matrices.

We claim:

1. The method of making mineral fibers having a mod ratio greater than about 1.2 comprising discharging molten mineral material having a liquidus greater than about 1200° F. (649° C.) as primary molten streams from orifices positioned in the wall of a container for holding a body of molten mineral material, joining at least one primary stream to an adjacent primary stream to form a hollow coalesced molten stream of different cross-sectional shape from that of the orifices, the mineral material in said coalesced stream having a low enough initial viscosity that said stream would assume a circular cross-section in the absence of quenching, and quenching the hollow coalesced stream to harden it into a hollow mineral fiber having a cross-sectional shape similar to the shape of the coalesced stream.

2. The method of claim 1 in which the external perimeter of the cross-section of said mineral fiber is non-circular.

3. A hollow mineral fiber produced according to the method of claim 2.

4. The method of making mineral fibers having a mod ratio greater than about 1.2 comprising discharging molten mineral material having a liquidus greater than about 1200° F. (649° C.) as multilobal primary molten streams from orifices positioned in the wall of a container for holding a body of molten mineral material, joining a lobe of a primary stream to an adjacent lobe of said primary stream to form a coalesced molten stream of different cross-sectional shape from that of the orifices, the mineral material in said coalesced stream having a low enough initial viscosity that said stream would assume a circular cross-section in the absence of quenching, and quenching the coalesced stream into a mineral fiber having a cross-sectional shape similar to the shape of the coalesced stream.

5. The method of claim 4 in which the external perimeter of the cross-section of said mineral fiber is non-circular.

6. The method of claim 5 in which said joining step forms a coalesced stream having a hollow cross-sectional shape, and in which the hollow coalesced stream is hardened into a hollow mineral fiber.

* * * * *